Feb. 7, 1939.  O. SCHILLING  2,146,131
INTERNAL COMBUSTION ENGINE
Filed March 17, 1936  2 Sheets-Sheet 2

Inventor
OTTO SCHILLING
ATTORNEY

Patented Feb. 7, 1939

2,146,131

UNITED STATES PATENT OFFICE 2,146,131

INTERNAL COMBUSTION ENGINE

Otto Schilling, Stuttgart-Unterturkheim, Germany, assignor to Daimler-Benz Aktiengesellschaft, Stuttgart-Unterturkheim, Germany Application March 17, 1936, Serial No. 69,276
In Germany March 18, 1935

16 Claims. (Cl. 123—180)

My invention relates to an internal combustion engine and, more particularly, to means for starting Diesel engines of the liquid fuel injection type.

It has been proposed prior to my invention to provide Diesel engines with starting devices, whereby an auxiliary fuel mixture could be supplied to the main intake manifold of the engine. According to this prior proposal, the auxiliary fuel mixture was produced in a separate carburetor and supplied to the main intake manifold by an auxiliary conduit in such a manner that, instead of fresh air, this mixture was sucked into the cylinders of the engine through the main manifold when the engine was started. However, the auxiliary mixture was conducted into the air intake manifold at the intake end of the latter, that is to say, at a point spaced a considerable distance apart from some of the cylinders, whereby the fuel mixture was very irregularly delivered to the different cylinders, only those cylinders located close to the starting carburetor obtaining the required amount of fuel, whereas the cylinders farther spaced from the carburetor received insufficient fuel or no fuel at all.

These disadvantages were due to the fact that the mixture, when entering the wide main intake manifold, tended to condense in the latter owing to the decrease in pressure and owing to its small speed of flow, the tendency to condense increasing with the distance between the cylinder and the point of entry into the manifold.

The object of my invention is to avoid these disadvantages. I have found that a very satisfactory starting operation will result from an arrangement in which the auxiliary fuel mixture is conducted into the intake manifold at one or more points located as close as possible to the mouth-pieces of the manifold communicating with the cylinders of the engine. Preferably, the auxiliary conduit communicating with the starting carburetor should have a smaller cross-section than the air intake manifold, whereby a high speed of flow of the mixture in this conduit is secured and a condensation of the mixture is avoided.

Further objects of my invention will appear from a description of various preferred embodiments following hereinafter and the features of novelty will be pointed out in the claims.

Figure 1:
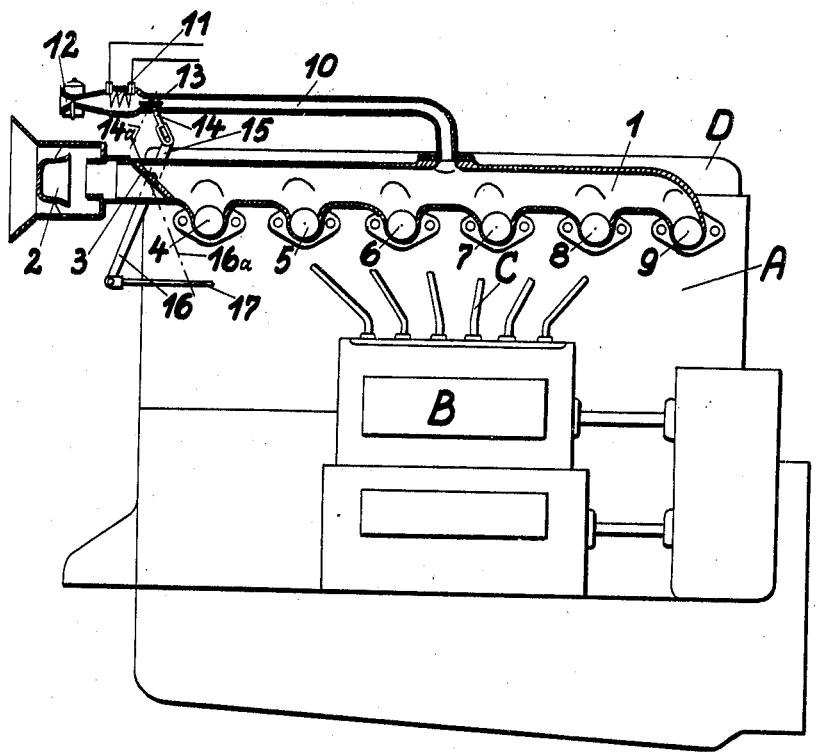
Fig. 1 is a diagrammatic elevation of a Diesel engine provided with an air intake manifold communicating at an intermediate point with an auxiliary mixture conduit, the manifold and the conduit being shown in section.

In Fig. 1, A is the cylinder block of a Diesel engine of the automotive type provided with a cylinder cover D and equipped with any suitable fuel pump B communicating by pipes C with the customary fuel injecting nozzles (not shown). In normal operation, the cylinders are supplied with air through the main intake manifold 1.

This manifold is provided with a suitable air filter 2, with a control valve shown as a butterfly-valve 3 and with a plurality of mouth-pieces 4, 5, 6, 7, 8 and 9, which communicate with the various cylinders of the engine.

For the purpose of the present invention, an auxiliary conduit 10 is provided, one end of which communicates with the main intake manifold 1 at an intermediate point thereof, while the other end communicates with a starting carburetor 12. An electric heating coil 11 is included in the conduit 10 near the carburetor. The auxiliary carburetor 12 may be disabled by closing a butterfly-valve 13 provided in the conduit 10. An arm 14 attached to the shaft of the butterfly-valve 13 is so connected by pin and slot with an arm 15 attached to the shaft of the butterfly-valve 3 that the valve 13 will be opened when the valve 3 is closed and vice versa. A controlling linkage indicated at 17 connected to an arm 16 of the shaft of the valve 3 is provided for the control of the valve mechanism.

The operation of the device illustrated in Fig. 1 is as follows:

When the Diesel engine is to be started, the valve 3 is closed and the valve 13 is opened by a suitable manipulation of the link 17, as shown in Fig. 1. Now the starter of the engine is operated, whereby suction is created in the cylinders. As soon as one of the cylinders begins to suck, the vacuum produced in the manifold 1 and in the conduit 10 will draw mixture out of the carburetor 12 past the heating coil 11 into the air intake manifold 1, wherefrom the mixture will pass to the respective sucking cylinders.

Owing to the small cross-section of the conduit 10, the mixture is supplied by the auxiliary carburetor 12 with a speed of flow higher than that which exists in normal operation in the air intake manifold, to the middle of the air intake manifold 1, wherefrom it flows through a comparatively short path to the cylinder sucking at any time. Owing to the high speed of flow in the conduit 10 and to the short path to be traversed by the mixture in the manifold 1, condensation of the mixture on its way from the carburetor to the cylinders is reduced to a minimum. As soon as the speed of rotation of the engine has reached the limit required for normal operation, the arms 14 and 15 are shifted to the position indicated by the dash-and-dot lines 14a and 16a by a suitable manipulation of the controlling linkage 17, whereby the valve 13 is closed and the valve 3 is opened. Now, the motor is supplied with air through the filter 2 for ordinary operation. The valves may be shifted by hand or automatically by a suitable governor operated from the shaft of the engine. The governor which is not shown in the drawings, may be of the customary centrifugal type.

Figure 2:
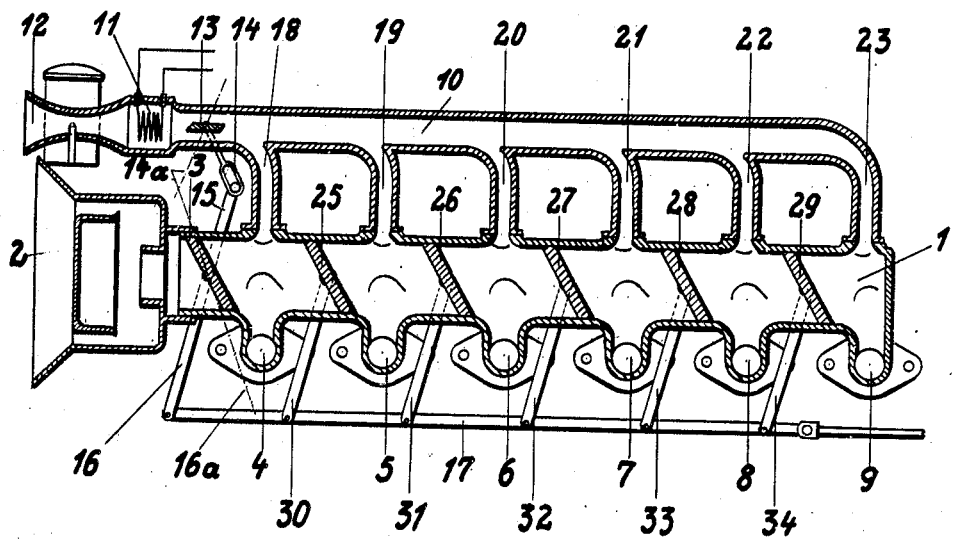
Fig. 2 is a sectional illustration, similar to that of Fig. 1, of a modified manifold combined with an auxiliary starting carburetor manifold.

In the embodiment of Fig. 2, the auxiliary conduit is formed by a manifold having as many branches 18, 19, 20, 21, 22 and 23 as mouthpieces of the air intake manifold are provided, the branches communicating with the intake manifold at points located in close proximity to the mouth-pieces 4, 5, 6, 7, 8 and 9. A plurality of butterfly-valves 25, 26, 27, 28 and 29 are arranged in the air intake manifold 1 so as to subdivide the interior thereof into a plurality of compartments, each compartment communicating with one of the branches 18 to 23 and with one of the mouth-pieces 4 to 9.

The shafts of the butterfly-valves carry arms 30, 31, 32, 33 and 34 which are linked to a common controlling rod 17. Moreover, the rod 17 is linked to the arm 16 of the butterfly-valve 3 which corresponds to that shown in Fig. 1. Hence, all of the valves 25 to 29 will be turned to open or closed position together with the valve 3. The elements 11, 12, 13, 14 and 15 are the same as those designated by similar reference numerals in Fig. 1. Their description need not be repeated.

The operation of the device illustrated in Fig. 2 is similar to that of Fig. 1. When a cylinder produces suction, a vacuum is formed in the associated compartment confined in the intake manifold by two valves. This vacuum withdraws mixture from the starting carburetor 12 through the associated branch of the conduit 10 from where the mixture enters the manifold and passes to the sucking cylinder. When the speed of the engine has reached the limit required for normal operation, the valves are manually or automatically shifted by operation of the link 17 as described above with reference to Fig. 1.

Figure 3:
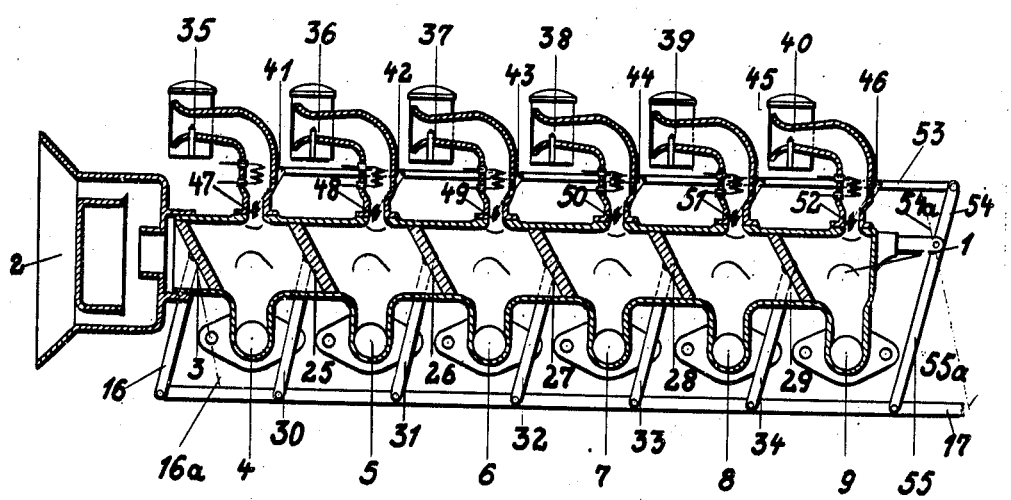
Fig. 3 represents a sectional elevation of a third embodiment in which a plurality of starting carburetors are provided.

In the embodiment of Fig. 3, each of the compartments confined in the intake manifold by the valves mounted therein is provided with an individual carburetor 35, or 36, 37, 28, 39, 40 respectively. The operating arms 41, 42, 43, 44, 45 and 46 of the associated carburetor valves 47, 48, 49, 50, 51 and 52 are so interconnected by a common link 53 that all of these valves will move simultaneously in the same sense. The link 53 is connected with the link 17 operating the valve arms 16, 30, 31, 32, 33 and 34 by a double-armed lever 54, 55, whereby the valves in the intake manifold will be closed when the carburetor valves are opened.

The operation of the device illustrated in Fig. 3 is as follows:

When the engine is to be started, the valves will assume the position illustrated in Fig. 3. When a cylinder produces suction, vacuum will be built up in the compartment of the manifold associated with the particular cylinder as described above with reference to Fig. 2. Owing to this vacuum, mixture is directly withdrawn from the carburetor coordinated to this particular compartment, while the other compartments of the intake manifold and the other carburetors remain unaffected thereby. When the speed of the engine has reached the limit required for normal operation, the link 17 is manually or automatically so operated as to move the double-armed lever 54 to the position indicated by the dash-and-dot line 55a, whereby all of the valves in the intake manifold and all of the carburetor valves will be shifted.

If desired, the starting carburetors may be so interconnected individually or in groups that they are opened at different instants in a timed relationship relative to each other or relative to the valves in the intake manifold. The heating devices may be coordinated with the starting carburetors and/or with the auxiliary conduits as desired. Moreover, a branch of the auxiliary conduit may be coordinated to a pair of cylinders or a group comprising three or four cylinders.

Further possible modifications will be apparent to anyone skilled in the art, and I do not intend to limit this invention to the illustrative structure described above except as may be required by the claims which follow.

What I claim is:—

1. In a multi-cylindered internal combustion engine, the combination comprising an air intake manifold provided with a plurality of mouth-pieces communicating with the cylinders of the engine, valves arranged within said manifold and adapted, when closed, to subdivide the interior thereof into a plurality of separate compartments each communicating with at least one of said mouth-pieces, at least one carburetor, and a plurality of conduits, one for each of said compartments for supplying an auxiliary fuel mixture from said carburetor to said compartments for the purpose of starting the engine, and means for disabling said carburetor.

2. In a multi-cylindered internal combustion engine, the combination comprising an air intake manifold provided with a plurality of mouth-pieces communicating with the cylinders of the engine, valves arranged within said manifold and adapted to subdivide the interior thereof into a plurality of separate compartments each communicating with at least one of said mouth-pieces, at least one carburetor, a plurality of conduits, one for each of said compartments for supplying an auxiliary fuel mixture from said carburetor to said compartments for the purpose of starting the engine, a carburetor valve adapted to disable said carburetor, and a control mechanism adapted to open said carburetor valve when said first-mentioned valves are closed.

3. In a multi-cylindered internal combustion engine, the combination comprising an air intake manifold provided with a plurality of mouth-pieces communicating with the cylinders of the engine, an auxiliary starting carburetor, an auxiliary manifold connecting said carburetor with said air intake manifold and communicating with the latter at points adjacent to said mouth-pieces, the cross-section of said auxiliary manifold being a fraction of that of said air intake manifold, valves arranged within said air intake manifold and adapted to subdivide the same into separate compartments, a valve in the auxiliary manifold for disabling said carburetor, and a common controlling linkage for said valves adapted to open said carburetor valve when said first-mentioned valves are closed, and vice versa.

4. In a multi-cylindered internal combustion engine of the class utilizing liquid fuel injection and compression ignition, the combination comprising an air intake manifold provided with a plurality of mouthpieces communicating with the cylinders of the engine, a carburetor, a conduit connecting said carburetor with said manifold and communicating therewith in at least one point at the top thereof located in relative proximity to said mouth-pieces, whereby an auxiliary fuel mixture may be readily supplied from said carburetor to said cylinders for the purpose of starting the engine, and a heating device associated with said conduit to prevent the auxiliary fuel mixture from condensing.

5. In a multi-cylindered internal combustion engine of the class utilizing liquid fuel injection and compression ignition, the combination comprising a manifold provided with a plurality of mouth pieces communicating with said cylinders, means for supplying air to said cylinders through said manifold, a conduit communicating with the top of said manifold at at least one point located in relative proximity to said mouth pieces, and means for supplying an auxiliary fuel mixture to said conduit, whereby quantities of said auxiliary fuel mixture will be readily supplied to the engine cylinders.

6. The combination according to claim 5 in which said last means includes a carburetor.

7. The combination according to claim 5 in which said last means includes a carburetor and in which the conduit has a cross-section smaller than the manifold.

8. The combination according to claim 5 in combination with a valve for closing said air supply means, a second valve for closing said conduit, and control means interconnecting said valves for moving them alternatively to their respective operating positions.

9. In an internal combustion engine having compression ignition and liquid fuel injection, the combination comprising a plurality of cylinders, an air intake manifold provided with a plurality of mouth pieces communicating with the cylinders of the engine, valves arranged within said manifold and adapted when closed to sub-divide the interior thereof into a plurality of separate compartments, each communicating with at least one of said mouth pieces, a plurality of conduits each with an air intake opening and an opening communicating with one of the compartments of the intake manifold, said conduits having a cross-section smaller than that of said main intake manifold, a plurality of carburetors, one for each of said conduits for supplying an auxiliary fuel mixture to the respective compartments of the main intake manifold for the purpose of starting the engine, additional valves, one for each of said conduits; and a control mechanism for closing the valves in the air intake manifold and opening the valves in the said conduits, and vice versa.

10. In a multi-cylindered internal combustion engine of the class utilizing liquid fuel injection and compression ignition, the combination comprising an air intake manifold provided with a plurality of mouth pieces communicating with said cylinders, a first valve located near the intake opening of the manifold for closing said intake opening, a carbureter, a conduit connecting said carbureter with said manifold and having a smaller cross section than that of said manifold, said conduit communicating with the main intake manifold at at least one point located approximately in the middle thereof between the first and last of said cylinders, a second valve adapted to disable the carbureter in the conduit, and a control mechanism connected with said valves and adapted to move the same alternatively to effective positions.

11. In an internal combustion engine, the combination according to claim 9, in combination with heating devices, each one of which is respectively positioned in each of the fuel mixture carrying conduits.

12. In an internal combustion engine, the combination according to claim 1, in combination with at least one heating device by means of which the auxiliary fuel mixture flowing from the carbureter into each of said compartments is preheated.

13. In a multi-cylindered internal combustion engine of the class utilizing liquid fuel injection and compression ignition, the combination of an air intake tube having a plurality of mouth-pieces leading to the individual cylinders, a closure member for throttling or closing the air intake tube relative to the outer air, an auxiliary carbureter device in which a starting fuel mixture is produced, and means for carrying the starting mixture produced in the carbureter device into the intake tube at a point in the middle of the same between the first and the last cylinder.

14. In an internal combustion engine, the combination according to claim 13, in combination with a closure device by means of which the carbureter is placed in or out of commision, and control means connecting said closure device with the closure member in the intake tube in such a manner that upon closing of said air intake closure member, the said closure device is opened, and vice versa.

15. In a multi-cylindered internal combustion engine of the class utilizing liquid fuel injection and compression ignition, the combination of an air intake tube having a plurality of mouthpieces leading to the individual cylinders, a closure member for throttling or closing said air intake tube against outside air, an auxiliary carbureter, and a conductor leading from the carbureter to said air intake tube, said conductor having smaller cross section than the air intake tube and being connected to the latter at a point substantially in the middle thereof, between the first and last cylinder.

16. In an internal combustion engine, the combination according to claim 15, in combination with a heating device in said conductor for preheating the fluid passing therethrough before its entry into said air intake tube.

OTTO SCHILLING.